(12) United States Patent
Kang et al.

(10) Patent No.: US 10,965,532 B2
(45) Date of Patent: Mar. 30, 2021

(54) SOFTWARE-DEFINED NETWORKING DEVICE BASED ON SERVICE PROFILE LEARNING

(71) Applicant: HAMONSOFT CO., LTD., Seoul (KR)

(72) Inventors: Won Sok Kang, Seongnam-si (KR); Seok Ho Lee, Gimpo-si (KR)

(73) Assignee: HAMONSOFT CO., LTD., Seoul (KR)

( * ) Notice: Subject to any disclaimer, the term of this patent is extended or adjusted under 35 U.S.C. 154(b) by 0 days.

(21) Appl. No.: 16/364,611

(22) Filed: Mar. 26, 2019

(65) Prior Publication Data

US 2020/0169463 A1 May 28, 2020

(30) Foreign Application Priority Data

Nov. 22, 2018 (KR) .................. 10-2018-0145442

(51) Int. Cl.
*H04L 12/24* (2006.01)
*H04L 12/46* (2006.01)
*H04L 12/26* (2006.01)
*H04L 12/715* (2013.01)

(52) U.S. Cl.
CPC ...... *H04L 41/0893* (2013.01); *H04L 12/4641* (2013.01); *H04L 41/0806* (2013.01); *H04L 41/16* (2013.01); *H04L 41/5041* (2013.01); *H04L 43/028* (2013.01); *H04L 45/64* (2013.01)

(58) Field of Classification Search
CPC . H04L 41/0893; H04L 41/16; H04L 12/4641; H04L 41/5041; H04L 45/64
USPC ........................................................ 709/223
See application file for complete search history.

(56) References Cited

U.S. PATENT DOCUMENTS

2015/0207677 A1* 7/2015 Choudhury ............. H04L 47/12
370/254
2017/0019302 A1* 1/2017 Lapiotis ................ H04L 41/145

FOREIGN PATENT DOCUMENTS

| JP | 2012-085005 A | 4/2012 |
| KR | 10-1996-0036460 A | 10/1996 |
| KR | 10-2005-0046092 A | 5/2005 |
| KR | 10-2008-0096102 A | 10/2008 |

(Continued)

OTHER PUBLICATIONS

Korean Office Action for related KR Application No. 10-2018-0145442 dated Sep. 6, 2019 from Korean Intellectual Property Office.

*Primary Examiner* — David R Lazaro
*Assistant Examiner* — Zia Khurshid
(74) *Attorney, Agent, or Firm* — Paratus Law Group, PLLC

(57) ABSTRACT

Disclosed is a software-defined networking device based on service profile learning. The device includes a physical network configuration unit for configuring a physical network via identification of a plurality of physical nodes, a service profile generating unit for analyzing packets respectively communicated from end nodes among the plurality of physical nodes to generate a service profile, a service profile learning unit for learning spatiality and temporality of the packets, and segmenting the plurality of physical nodes into service profile groups based on the learning result, and a software-defined networking unit for configuring a virtual network on a service profile group basis to generate a software-defined network.

8 Claims, 4 Drawing Sheets

(56) References Cited

FOREIGN PATENT DOCUMENTS

KR  10-2013-0130783 A  12/2013

* cited by examiner

SOFTWARE-DEFINED NETWORKING DEVICE BASED ON SERVICE PROFILE LEARNING

CROSS-REFERENCE TO RELATED APPLICATION

This application claims priority to and the benefit of Korean Patent Application No. 10-2018-0145442 filed on Nov. 22, 2018, which is hereby incorporate by reference in its entirety.

BACKGROUND

The present invention relates to software-defined networking based on service profile learning, and more particularly, to a software-defined networking device based on service profile learning that efficiently manages a network via a segmentation of physical network nodes into units of service profile groups.

A computer network is one of digital telecommunication networks that allows nodes to share resources. That is, the computer network refers to a network of distributed computers. Computing devices in the computer network exchange data with each other using inter-node connections (data links). These data links are established via cable media such as a fiber-optic cable, or wireless media such as Wi-Fi. Network computer devices that send, route, and terminate data are referred to as network nodes. The nodes may include hosts such as personal computers, telephones, servers, and network hardware. Among these devices, when one device may exchange information with another device regardless whether they are directly connected to each other, the two devices form a network. In most cases, application-specific communication protocols are layered over other, more general, communication protocols.

Most networks were in a tree structure of Ethernet switches and routers, which is a client-server orient design. In the past, this structure wasn't a problem much since most communications took place between the client and the server. A network is constituted by sets of discrete protocols for connecting a large number of computers via a fixed topology. When adding a device to the network, associated switches, routers, firewalls, and authentication systems must be manipulated. The network topology must be changed, and product models and software versions must be managed. Before an emergence of a virtualization technology, an application was executed on a single server, and the sever transmitted or received traffic to or from the client. Unlike in the past, where the client and the server perform a large capacity communication with each other, these days, an application generates various traffic while accessing an application server and a database (DB) before providing data to a user. Applications are distributed in a plurality of virtual machines (VMs). Therefore, network management becomes more complex. In the early days of the Internet, this was not a problem. The network was fine if being managed on time. However, with a rapid growth of mobile devices and an emergence of cloud-based virtualization services, traffic patterns have changed.

Korean Patent No. 10-1996-0036460 (Oct. 28, 1996) preserves a sequential order in which packets are presented to a network like virtual-circuit networks, but does not require node-by-node call set-up or tear-down, unlike virtual-circuit networks. Korean Patent No. 10-1996-0036460 includes determining the topology of a network of packet switches that are connected by communication links, associating at least two names (e.g. 10a and 10b) with at least one of the packet switches 10, and populating the router tables (913) in the packet switches so that for each name the packet switches and communication links form an elemental network with the topology of a sink tree with the named packet switch at the root of the tree.

Korean Patent No. 10-2005-0046092 (May 18, 2005) discloses a network apparatus and packet routing method for ubiquitous computing. In the network apparatus, a movement detection unit detects movement from a first network to a second network, and a movement address setting unit generates care-of-address (CoA) information corresponding to prefix information of the second network. A movement registration unit registers a movement address by transmitting a binding update message containing the generated CoA and home address (HoA) mapping information, to a home agent. A resource setting unit registers information on current terminal apparatuses among network terminal apparatuses on the second network. A packet distribution unit distributes the received packet to a current terminal apparatus corresponding to the application characteristic of the packet received from the home agent based on the information on the current terminal apparatuses. In Korean Patent No. 10-2005-0046092, user mobility may be perfectly guaranteed, and the application service may be provided via various terminals on the network near the user by the message routing on the network device.

RELATED ART DOCUMENT

Patent Document

Korean Patent No. 10-1996-0036460 (Oct. 28, 1996)
Korean Patent No. 10-2005-0046092 (May 18, 2005)

SUMMARY

The present invention provides a software-defined networking device based on service profile learning that efficiently manages a network via a segmentation of physical network nodes on a service profile group basis.

The present invention also provides a software-defined networking device based on service profile learning that configures a virtual network on a service profile group basis to generate a software-defined network and manage a network via the generated software-defined network.

The present invention also provides a software-defined networking device based on service profile learning that learns spatiality and temporality of packets to generate a service profile group.

In an aspect, a software-defined networking device based on service profile learning is provided. The device includes a physical network configuration unit for configuring a physical network via identification of a plurality of physical nodes, a service profile generating unit for analyzing packets respectively communicated from end nodes among the plurality of physical nodes to generate a service profile, a service profile learning unit for learning spatiality and temporality of the packets, and segmenting the plurality of physical nodes into service profile groups based on the learning result, and a software-defined networking unit for configuring a virtual network on a service profile group basis to generate a software-defined network.

In one implementation of the aspect, the service profile generating unit may perform deep packet inspection (DPI) on packets transmitted from source nodes among the end nodes among the plurality of physical nodes to determine packets of the same type within a specific time range.

In one implementation of the aspect, the service profile generating unit may initially generate a service profile for the packets of the same type, and extend the service profile based on the packets of the same type respectively communicated from the end nodes among the plurality of physical nodes.

In one implementation of the aspect, the service profile learning unit may classify, via learning, the packets into packets of the same type generated within a specific time range.

In one implementation of the aspect, the service profile learning unit may group the plurality of physical nodes based on sources and destinations of the classified packets of the same type.

In one implementation of the aspect, the service profile learning unit may merge discrete groups among the plurality of groups of physical nodes into a single group and determine the single group as the service profile group.

In one implementation of the aspect, the software-defined networking unit may configure a specific service-oriented network based on the service profile group via the virtual network configuration, and thus reconfigure a physical sub-network for service optimization.

In one implementation of the aspect, the software-defined networking unit may analyze travel paths of the corresponding packets during the reconfiguration of the physical sub-network, and then include other physical nodes not included in the corresponding sub-network based on the analysis result into the corresponding sub-network as relay nodes.

DETAILED DESCRIPTION

Figure 1:
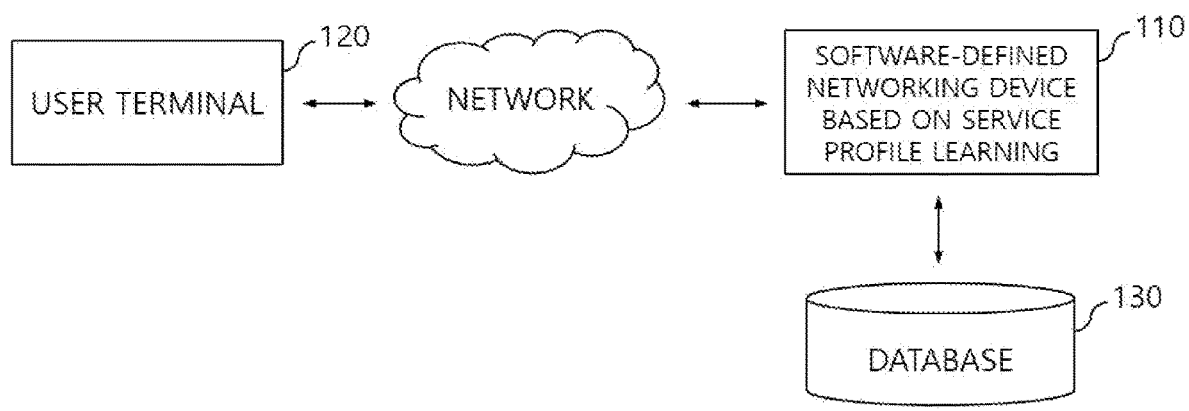
FIG. 1 illustrates a software-defined networking system based on service profile learning according to an embodiment of the present invention.

Explanation of the present invention is merely an embodiment for structural or functional explanation. Therefore, the scope of the present invention should not be construed to be limited to the embodiments explained in the embodiment. That is, the embodiment may be variously modified and may take various forms. Thus, it should be understood that the scope of the present invention encompasses equivalents capable of realizing technical features. Further, purposes or effects set forth in the present invention are not meant to imply that a particular embodiment should include all or only these effects. The scope of the present invention should not be understood as being limited thereto.

Terms described in the present invention may be understood as follows.

The terms "first", "second", and so on are used to distinguish one component from another component, and these components should not be limited by these terms. For example, a first component could be termed a second component, and likewise, a second component could be termed a first component.

It will be understood that when a component is referred to as being "connected to", or "coupled to" another component, it can be directly on, connected to, or coupled to the other component, or one or more intervening components may be present. In contrast, when a component is referred to as being "directly connected to" or "directly coupled to" another component or layer, there are no intervening components present. Further, other expressions that describe relationships between components, such as "between", "directly between", "adjacent to", "directly adjacent to", or the like should be also interpreted as above.

As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, components, parts, or combinations thereof but do not preclude the presence or addition of one or more other features, integers, operations, components, parts, or combinations thereof.

Identification letters (e.g., a, b, c, etc.) in respective steps are used for the sake of explanation and do not described order of respective steps. The respective steps may be changed from a mentioned order unless specifically mentioned in context. Namely, respective steps may be performed in the same order as described, may be substantially simultaneously performed, or may be performed in reverse order.

The present invention may be implemented using a computer readable code on a computer readable recording medium. In addition, the computer readable recording medium includes all kinds of recording media storing data that may be decoded by the computer system. Examples of the computer readable recording medium include a ROM (Read Only Memory), a RAM (Random Access Memory), a CD-ROM, a magnetic tape, a floppy disk, an optical data storage device, etc. Further, the computer readable recording medium may be stored and executed using codes distributed in computer systems connected to a computer network and readable in a distributed manner.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 illustrates a software-defined networking system based on service profile learning according to an embodiment of the present invention.

With reference to FIG. 1, a software-defined networking system based on service profile learning 100 includes a software-defined networking device 110 based on service profile learning, a user terminal 120 and a database 130.

Software defined networking (SDN) is an approach in which a software-based controller controls and manages a traffic forwarding operation of a network via an open API (Application Program Interface). In the software-defined networking, a control plane that specifies a traffic path and a data plane that performs traffic forwarding are separated. Therefore, the software-defined networking may manage the network based on requirements without being bound to detailed configuration information of the network. That is, the software-defined networking may correspond to a technology in which a network control function is separated from a physical network such that a user controls the network with software.

The software-defined networking device (hereinafter a "software-defined networking device") 110 corresponds to a computing device that may be connected to the user terminal 120 via the network. The software-defined networking device 110 learns spatiality and temporality of packets of a plurality of physical network nodes, segments the nodes into service profile groups based on the learning result, and configures a virtual network to form a software-defined network. The software-defined networking device 110 may efficiently manage the network via the software-defined network thus generated.

The user terminal 120 corresponds to a computing device that may be connected to the software-defined networking device 110 to provide a user interface to a user. The user terminal 120 may be implemented as a smart phone, a laptop computer, or a computer, but is not limited thereto. The user terminal 120 may be implemented as various devices such as a tablet PC. The user terminal 120 may be connected to the software-defined networking device 110 via the network. Further, at least one user terminal 120 may be concurrently connected to the software-defined networking device 110.

The software-defined networking device 110 may be implemented with the database 130, or may be implemented independently of the database 130. When implemented independently of the database 130, the software-defined networking device 110 may be connected to the database 130 in a wired or wireless manner to exchange files.

The database 130 is a storage device that may store information required for providing the software-defined networking based on service profile learning. In one embodiment, the database 130 may store analysis information about packets respectively communicated from end nodes among the plurality of physical nodes or learning information about the spatiality and the temporality of the packets, but is not necessarily limited thereto. The database 130 may store information collected or processed in various forms in managing the network via the software-defined networking based on service profile learning.

Figure 2:
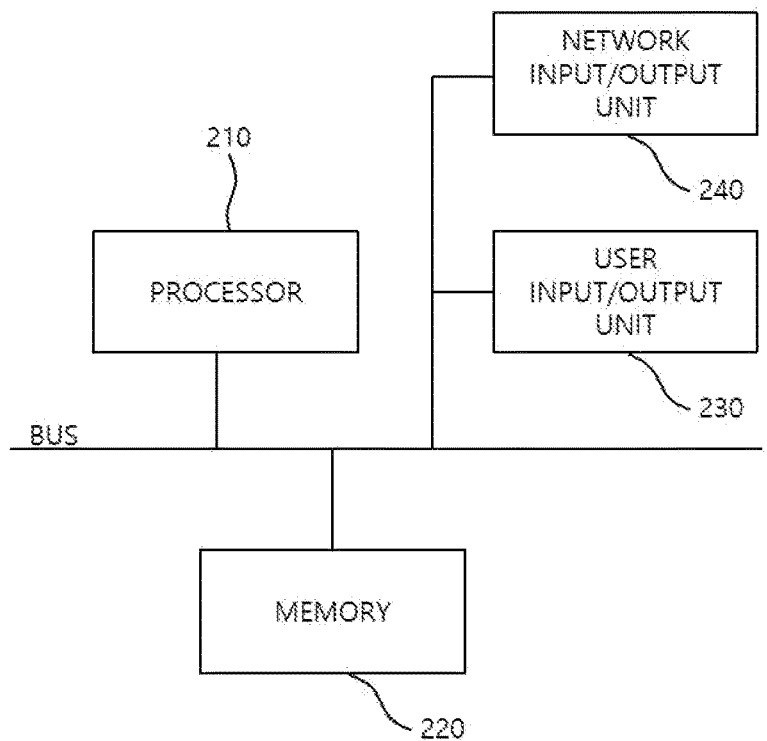
FIG. 2 illustrates a block diagram of a software-defined networking device based on service profile learning in FIG. 1.

FIG. 2 illustrates a block diagram of a software-defined networking device based on service profile learning in FIG. 1.

With reference to FIG. 2, software-defined networking device based on service profile learning (hereinafter, software-defined networking device) 110 may include a processor 210, a memory 220, a user input/output unit 230, and a network input/output unit 240.

The processor 210 may manage or control the network via the software-defined network based on service profile learning, manage the memory 220 that is read or written in this process, and schedule a synchronization time between a volatile memory and a nonvolatile memory in the memory 220. The processor 210 may control an overall operation of the software-defined networking device 110. Further, the processor 210 may be electrically connected to the memory 220, the user input/output unit 230, and the network input/output unit 240 to control data flow therebetween. The processor 210 may be implemented as a central processing unit (CPU) of the software-defined networking device 110.

The memory 220 may include an auxiliary storage device implemented as a nonvolatile memory such as a solid state disk (SSD) or a hard disk drive (HDD) for storing overall data required for the software-defined networking device 110, and include a main memory implemented as a volatile memory such as a random access memory (RAM).

The user input/output unit 230 may include an environment for receiving a user input and an environment for outputting specific information to the user. For example, the user input/output unit 230 may include an input device including an adapter such as a mouse, a trackball, a graphic tablet, a scanner, a touch screen, a keyboard, or a pointing device, and an output device including an adapter such as a monitor. In one embodiment, the user input/output unit 230 may correspond to a computing device that is connected remotely, in which case, the software-defined networking device 110 may perform as a server.

The network input/output unit 240 may include an environment for connection to at least the software-defined networking device 110, and include, for example, an adapter for a local area network (LAN) communication. In one embodiment, the software-defined networking device 110 may be connected to the user terminal 120 or the database 130 via the network input/output unit 240.

Figure 3:
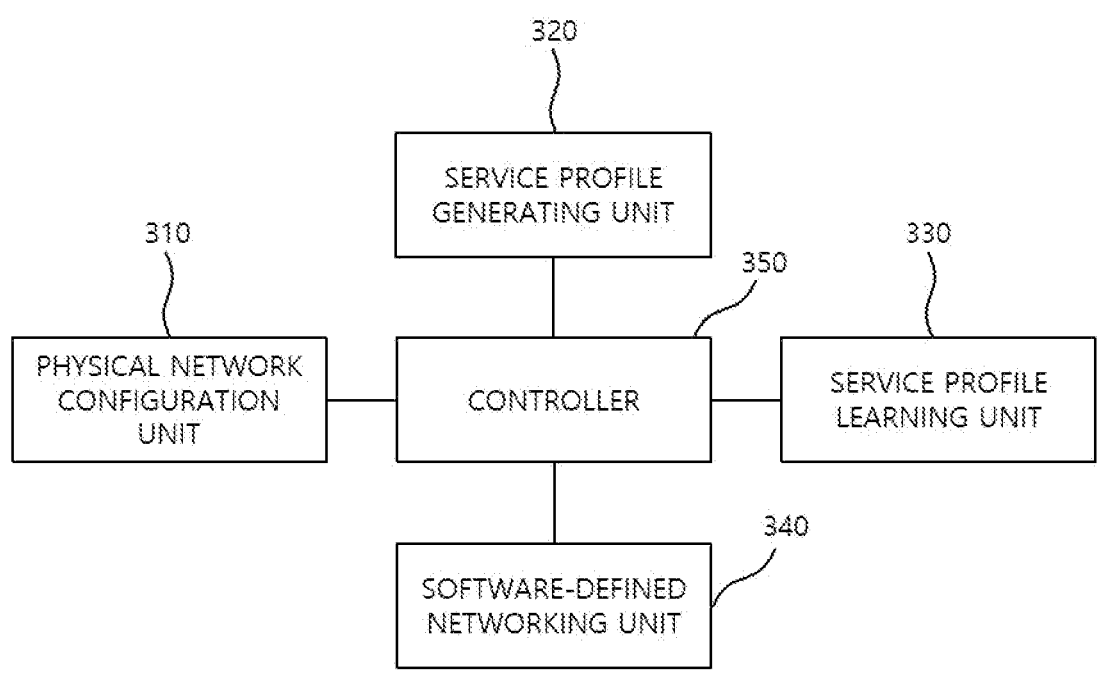
FIG. 3 is a block diagram illustrating components of a processor according to an embodiment of the present invention.

FIG. 3 is a block diagram illustrating components of a processor according to an embodiment of the present invention.

With reference to FIG. 3, the processor 210 of the software-defined networking device 110 based on service profile learning may include a physical network configuration unit 310, a service profile generating unit 320, a service profile learning unit 330, a software-defined networking unit 340, and a controller 350.

The physical network configuration unit 310 may configure the physical network via identification of the plurality of physical nodes. In this connection, the physical network may be constituted by a cable that connects another hardware in the network, an adapter used for a connected computer, a router, a bridge, and the like. Generally, a type of the physical network may correspond to a local area network (LAN) and a wide area network (WAN). In this connection, the configuration of the physical network may mean what physical form (topology) the network devices are connected. For example, the configuration of the physical network may be classified into various topologies of a mesh type, a star type, a bus type, or a ring type.

The service profile generating unit 320 may analyze the packets respectively communicated from end nodes among the plurality of physical nodes to generate a service profile. In this connection, the packet may correspond to a data transmission unit that is cut to facilitate the transmission via the network. The service profile is to represent information about a service and to notify the service. Thus, the service profile may contain information about what the service does. For example, the service profile may contain information corresponding to a video chat service, an email service, a data sharing service, or an internet telephone service. More specifically, the service profile generating unit 320 may generate the service profile based on a transmitted data packet.

In one embodiment, the service profile generating unit 320 may perform DPI (Deep Packet Inspection) on packets transmitted from source nodes among end nodes among the plurality of physical nodes. In this connection, DPI is a technique used to adjust the network traffic. That is, the deep packet inspection may determine whether a specific data packet to continue to its destination or to be blocked or delayed while a more important traffic proceeds based on a priority determined by a network provider. The service profile generating unit 320 may perform the DPI to determine packets of the same type within a specific time range. More specifically, the service profile generating unit 320 may determine the packets of the same type within the specific time range via the DPI to adjust the network traffic.

In one embodiment, the service profile generating unit 320 may initially generate a service profile for packets of the same type, and extend the service profile based on the packets of the same type respectively communicated from end nodes among the plurality of physical nodes. More specifically, the service profile generating unit 320 may initially generate a service profile for packets of the same type within a specific time range determined via the DPI, and then extend the service profile continuously for the same type.

The service profile learning unit 330 may learn the spatiality and temporality of the packets, and segments the plurality of physical nodes into the service profile groups. In this connection, the spatiality may refer to information in which sources and destinations of packets of the same type are spatialized. The temporality may refer to times at which packets of the same type are respectively transmitted from the same source to different destinations. For example, the service profile learning unit 330 may segment nodes transmitting packets with overlapping spatiality or temporality among the plurality of physical nodes into the same service profile group.

In one embodiment, the service profile learning unit 330 may classify, via learning, the packets into packets of the same type generated within a specific time range. For example, the service profile learning unit 330 may detect probabilities of generation of packets of a specific same type within a specific time range via learning, and classify packets of the specific same type having the probabilities of generation equal to or higher than a specific reference.

In one embodiment, the service profile learning unit 330 may group the plurality of physical nodes based on the sources and destinations of the classified packets of the same type. More specifically, the service profile learning unit 330 may detect the sources and destinations of the packets of the same type generated within the specific time range, and group a plurality of physical nodes transmitting packets having the same source and destination.

In one embodiment, the service profile learning unit 330 may merge discrete groups among the plurality of groups of physical nodes into a single group to determine a service profile group. For example, the service profile learning unit 330 may merge the plurality of discrete groups grouped with the packets of the same type having the same source and destination that are generated within the same time range into a single group, and determine the single group as a service profile group.

The software-defined networking unit 340 may configure the virtual network on a service profile group basis to generate the software-defined network. The software-defined networking unit 340 may configure the virtual network constituted by at least one service profile group. For example, the software-defined networking unit 340 may configure the virtual network in a mesh type, a star type, or a ring type. More specifically, when the plurality of groups grouped based on the spatiality and temporality of the packets respectively communicated from end nodes among the plurality of physical nodes are merged into the single group to determine the service profile group, the software-defined networking unit 340 may configure a virtual network on a service profile group basis to generate a software-defined network.

In one embodiment, the software-defined networking unit 340 may configure a specific service-oriented network based on the service profile group via the virtual network configuration, and thus reconfigure a physical sub-network for service optimization. For example, the software-defined networking unit 340 may configure internet video telephone service-oriented network based on the service profile group, and thus reconfigure a physical sub-network having an optimal virtual network configuration selected among various network configurations such as the mesh type, the star type, or the ring type for service optimization. More specifically, the software-defined networking unit 340 may configure the optimal network for the specific service based on the service profile group generated based on the learning about the packets of the same type, and thus reconfigure the physical sub-network.

In one embodiment, the software-defined networking unit 340 may analyze travel paths of the corresponding packets during the reconfiguration of the physical sub-network, and may include other physical nodes not included in the corresponding sub-network based on the analysis result into the corresponding sub-network as relay nodes. More specifically, the software-defined networking unit 340 may include other physical nodes necessarily existing on the travel paths of the specific packets as relay nodes into the corresponding sub-network during the reconfiguration of the specific service-oriented physical sub-network. For example, the software-defined networking unit 340 may determine a physical node for another service different from the service oriented in the corresponding sub-network as a relay node, and include the determined relay node into the corresponding sub-network.

The controller 350 may control the overall operation of the software-defined networking device 110. Further, the controller 350 may control data flow between the physical network configuration unit 310, the service profile generating unit 320, the service profile learning unit 330, and the software-defined networking unit 340.

Figure 4:
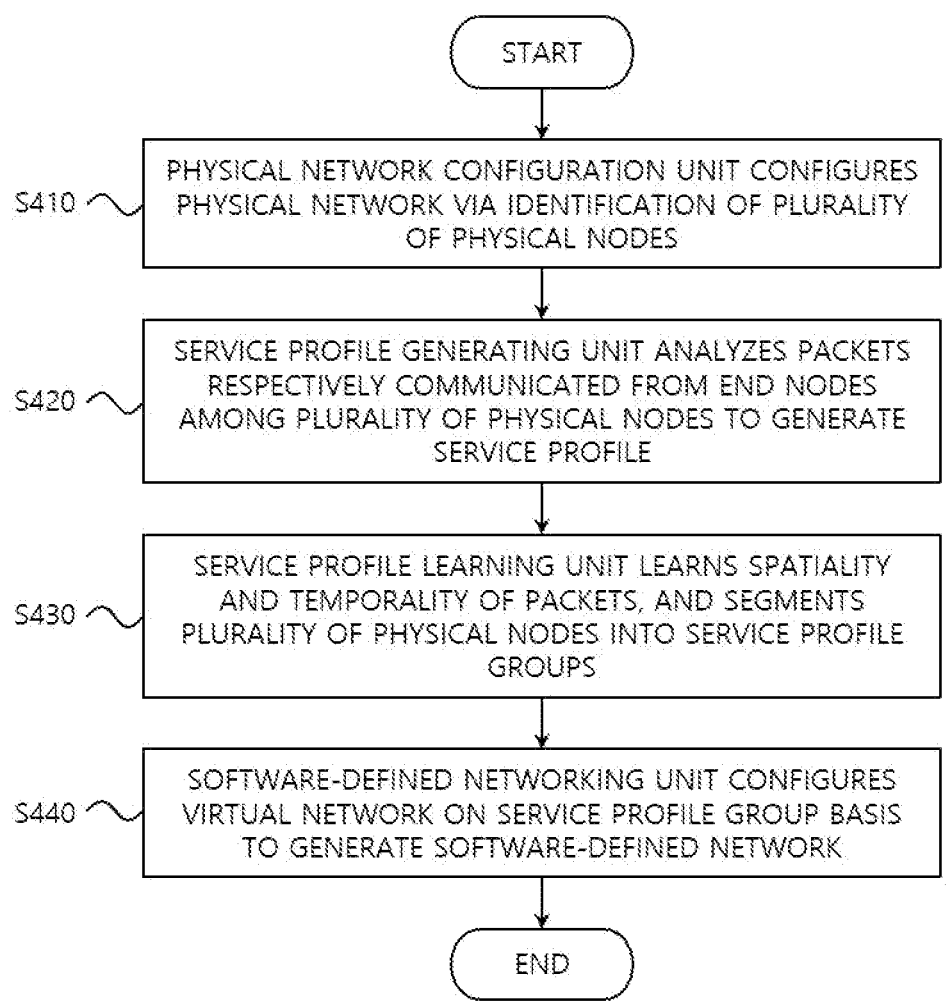
FIG. 4 is a flow chart showing operations of a software-defined networking device based on service profile learning according to an embodiment of the present invention.

FIG. 4 is a flow chart showing operations of a software-defined networking device based on service profile learning (hereinafter, software-defined networking device) according to an embodiment of the present invention.

In FIG. 4, the software-defined networking device 110 may configure the physical network via identification of the plurality of physical nodes via the physical network configuration unit 310 (S410).

The software-defined networking device 110 may analyze the packets respectively communicated from end nodes among the plurality of physical nodes to generate the service profile via the service profile generating unit 320 (S420).

The software-defined networking device 110 may learn the spatiality and temporality of the packets, and segment the plurality of physical nodes into the service profile groups via the service profile learning unit 330 (S430).

The software-defined networking device 110 may configure the virtual network on a service profile group basis to generate the software-defined network via the software-defined networking unit 340 (S440).

Figure 5:
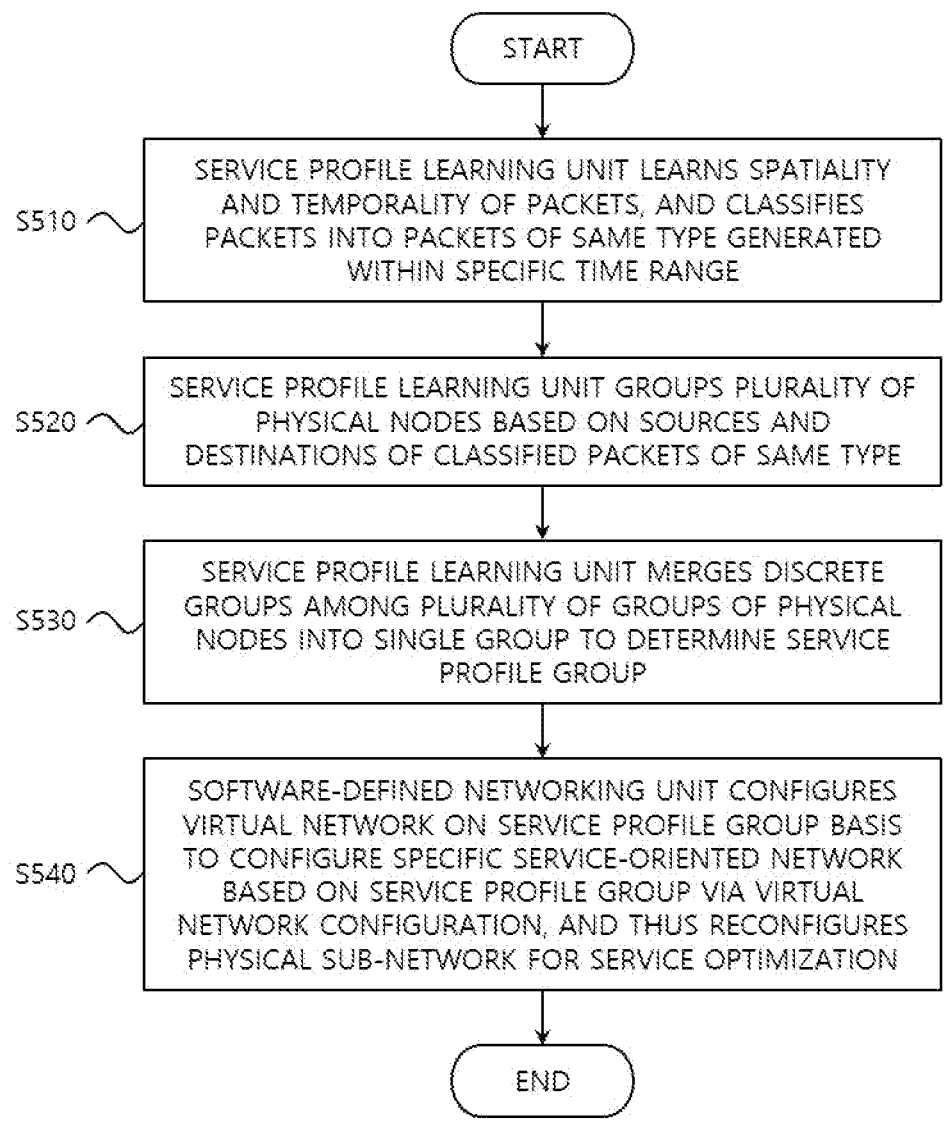
FIG. 5 is a flow chart showing operations of a software-defined networking device based on service profile learning according to another embodiment of the present invention.

FIG. 5 is a flow chart showing operations of a software-defined networking device based on service profile learning according to another embodiment of the present invention.

In FIG. 5, the software-defined networking device 110 may learn the spatiality and temporality of the packets, and classify the packets into the packets of the same type generated within the specific time range via the service profile learning unit 330 (S510).

The software-defined networking device 110 may group the plurality of physical nodes based on the sources and destinations of the classified packets of the same type via the service profile learning unit 330 (S520).

The software-defined networking device 110 may merge the discrete groups among the plurality of groups of physical nodes into the single group to determine the service profile group via the service profile learning unit 330 (S530).

The software-defined networking device 110 may configure the virtual network on a service profile group basis to configure the specific service-oriented network based on the service profile group via the virtual network configuration, and thus reconfigure the physical sub-network for the service optimization via the software-defined networking unit 340 (S540).

While the present invention has been described with reference to preferred embodiments, it will be understood by those skilled in the art that various changes in form and details may be made therein without departing from the spirit and scope of the present invention as set forth in the following claims.

The disclosed technology may have following effects. However, purposes or effects are not meant to imply that a particular embodiment should include all or only these effects. Therefore, the scope of the disclosed technology should not be understood as being limited thereto.

The software-defined networking device based on service profile learning according to an embodiment of the present disclosure may efficiently manage the network via the segmentation of the physical network nodes on a service profile group basis.

The software-defined networking device based on service profile learning according to an embodiment of the present disclosure may configure the virtual network on a service profile group basis to generate the software-defined network and to manage the network.

The software-defined networking device based on service profile learning according to an embodiment of the present disclosure may learn the spatiality and temporality of the packets to generate the service profile group.

What is claimed is:

1. A software-defined networking device based on service profile learning, the device comprising:
    a physical network configuration unit for configuring a physical network via identification of a plurality of physical nodes;
    a service profile generating unit for analyzing packets respectively communicated from end nodes among the plurality of physical nodes to generate a service profile;
    a service profile learning unit for learning spatiality and temporality of the packets, and segmenting physical nodes, of the plurality of physical nodes, that communicated the packets having overlapping spatiality or temporality into same service profile groups based on a result of the learning; and
    a software-defined networking unit for configuring a virtual network on a service profile group basis to generate a software-defined network
    wherein the physical network configuration unit, the service profile generating unit, the service profile learning unit, and the software-defined networking unit are each implemented via at least one processor.

2. The software-defined networking device of claim 1, wherein the service profile generating unit performs deep packet inspection (DPI) on packets transmitted from source nodes among the end nodes among the plurality of physical nodes to determine packets of a same type within a specific time range.

3. The software-defined networking device of claim 2, wherein the service profile generating unit initially generates a service profile for the packets of the same type, and extends the service profile based on the packets of the same type respectively communicated from the end nodes among the plurality of physical nodes.

4. The software-defined networking device of claim 1, wherein the service profile learning unit classifies, based on the result of the learning, the packets into packets of the same type generated within a specific time range.

5. The software-defined networking device of claim 4, wherein the service profile learning unit groups physical nodes of the plurality of physical nodes transmitting the classified packets of the same type generated within the specific time range into a plurality of groups of physical nodes, based on sources and destinations of the classified packets of the same type.

6. The software-defined networking device of claim 5, wherein the service profile learning unit merges discrete groups among the plurality of groups of physical nodes into a single group and determines the single group as a service profile group.

7. The software-defined networking device of claim 1, wherein the software-defined networking unit configures a specific service-oriented network based on the service profile groups via the virtual network configuration to reconfigure a physical sub-network for service optimization.

8. The software-defined networking device of claim 7, wherein the software-defined networking unit analyzes travel paths of corresponding packets during the reconfiguration of the physical sub-network, and then includes other physical nodes not included in a corresponding sub-network based on a result of the analysis into the corresponding sub-network, wherein the other physical nodes are included as relay nodes.

* * * * *